US011440090B2

United States Patent
Burbaum et al.

(10) Patent No.: US 11,440,090 B2
(45) Date of Patent: Sep. 13, 2022

(54) COMPOSITION FOR MATERIAL FOR LIQUID METAL DEPOSITION OR ADDITIVE MANUFACTURING, METHOD AND PRODUCT

(71) Applicant: Siemens Energy Global GmbH & Co. KG, Bayern (DE)

(72) Inventors: Bernd Burbaum, Falkensee (DE); Henning Hanebuth, Pliening OT Gelting (DE); Andreas Rucki, Munich (DE); Ahmed Kamel, Orlando, FL (US)

(73) Assignee: Siemens Energy Global GmbH & Co. KG, Bayern (DE)

(*) Notice: Subject to any disclaimer, the term of this patent is extended or adjusted under 35 U.S.C. 154(b) by 0 days.

(21) Appl. No.: 17/282,306

(22) PCT Filed: Aug. 2, 2019

(86) PCT No.: PCT/EP2019/070863
§ 371 (c)(1),
(2) Date: Apr. 1, 2021

(87) PCT Pub. No.: WO2020/074150
PCT Pub. Date: Apr. 16, 2020

(65) Prior Publication Data
US 2021/0323056 A1    Oct. 21, 2021

(30) Foreign Application Priority Data
Oct. 12, 2018   (EP) .................... 18200073

(51) Int. Cl.
*B22F 1/00* (2022.01)
*B33Y 10/00* (2015.01)
(Continued)

(52) U.S. Cl.
CPC ............ *B22F 1/0003* (2013.01); *B22F 10/20* (2021.01); *B23K 35/304* (2013.01);
(Continued)

(58) Field of Classification Search
None
See application file for complete search history.

(56) References Cited

U.S. PATENT DOCUMENTS

| 5,240,491 A | 8/1993 | Budinger et al. |
| 2002/0157737 A1* | 10/2002 | Chesnes ............ B23K 35/0244 148/528 |
| 2005/0067061 A1 | 3/2005 | Huang et al. |
| 2007/0175546 A1 | 3/2007 | Hoppe et al. |

(Continued)

FOREIGN PATENT DOCUMENTS

CN    205996408 U    3/2017

OTHER PUBLICATIONS

Xiao Huang et al: "Wide Gap Braze Repair of Gas Turbine Blades and Vanes—A Review", Journal of Engineering for Gas Turbines and Power., vol. 134, No. 1, pp. 10801, XP055473801, US ISSN: 0742-4795, DOI: 10.1115/1.4003962; Abstract; 2012.

(Continued)

*Primary Examiner* — Xiaobei Wang
(74) *Attorney, Agent, or Firm* — Wolter Van Dyke Davis, PLLC

(57) ABSTRACT

A composition of a nickel based alloy mixture which can be used for welding via especially liquid metal deposition or as a powder bed of an additive manufacturing method. A metallic powder mixture includes (in wt %): a cobalt (Co) or nickel (Ni) based super alloy with a content of 20% to 60%, a NiCoCrAlY-composition with a content of 70% to 30% and a metallic braze material with a content between 10% to 5%. The melting point of the braze material is at least 10K lower than the melting point of the nickel or cobalt based superalloy.

16 Claims, 2 Drawing Sheets

(51) Int. Cl.
*B33Y 70/00* (2020.01)
*B33Y 80/00* (2015.01)
*B22F 10/20* (2021.01)
*B23K 35/30* (2006.01)
*C22C 19/05* (2006.01)
*C22C 30/00* (2006.01)
*C22C 19/07* (2006.01)

(52) U.S. Cl.
CPC ...... *B23K 35/3033* (2013.01); *B23K 35/3046* (2013.01); *B33Y 10/00* (2014.12); *B33Y 70/00* (2014.12); *B33Y 80/00* (2014.12); *C22C 19/055* (2013.01); *C22C 19/056* (2013.01); *C22C 19/057* (2013.01); *C22C 30/00* (2013.01); *B22F 2301/15* (2013.01); *C22C 19/07* (2013.01); *Y10T 428/12944* (2015.01)

(56) References Cited

U.S. PATENT DOCUMENTS

2010/0196193 A1  8/2010  Minor
2012/0125979 A1  5/2012  Daniels et al.

OTHER PUBLICATIONS

PCT International Search Report and Written Opinion of International Searching Authority dated Sep. 9, 2019 corresponding to PCT International Application No. PCT/EP2019/070863 filed Aug. 2, 2019.

\* cited by examiner

FIG 3

| Werkstoff | C | Cr | Ni | Co | Mo | W | Ta | Nb | Al | Ti | B | Zr | Hf |
|---|---|---|---|---|---|---|---|---|---|---|---|---|---|
| Ni-Basis-Feingußlegierungen | | | | | | | | | | | | | |
| GTD 222 | 0.10 | 22.5 | Rest | 19.0 | | 2.0 | 1.0 | | 1.2 | 2.3 | 0.008 | | |
| IN 939 | 0.15 | 22.4 | Rest | 19.0 | | 2.0 | 1.4 | 1.0 | 1.9 | 3.7 | 0.009 | 0.10 | |
| IN 6203 DS | 0.15 | 22.0 | Rest | 19.0 | | 2.0 | 1.1 | 0.8 | 2.3 | 3.5 | 0.010 | 0.10 | 0.75 |
| Udimet 500 | 0.10 | 18.0 | Rest | 18.5 | 4.0 | | | | 2.9 | 2.9 | 0.006 | 0.05 | |
| IN 738 LC | 0.10 | 16.0 | Rest | 8.5 | 1.7 | 2.6 | 1.7 | 0.9 | 3.4 | 3.4 | 0.010 | 0.10 | |
| SC 16 | <0.01 | 16.0 | Rest | | 3.0 | | 3.5 | | 3.5 | 3.5 | <0.005 | <0.008 | |
| Rene 80 | 0.17 | 14.0 | Rest | 9.5 | 4.0 | 4.0 | | | 3.0 | 5.0 | 0.015 | 0.03 | |
| GTD 111 | 0.10 | 14.0 | Rest | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rest | 9.0 | 1.9 | 4.1 | 4.1 | | 3.4 | 3.8 | 0.015 | 0.02 | 1.00 |
| IN 792 DS | 0.08 | 12.5 | Rest | 9.0 | 1.9 | 4.1 | 4.1 | | 3.4 | 3.8 | 0.015 | 0.02 | 1.50 |
| MAR M 002 | 0.15 | 9.0 | Rest | 10.0 | | 10.0 | 2.5 | | 5.5 | 1.5 | 0.015 | 0.05 | 1.40 |
| MAR M 247 LC DS | 0.07 | 8.1 | Rest | 9.2 | 0.5 | 9.5 | 3.2 | | 5.6 | 0.7 | 0.015 | 0.02 | |
| CMSX-2 | <.006 | 8.0 | Rest | 4.6 | 0.6 | 8.0 | 6.0 | | 5.6 | 1.0 | <.003 | <.0075 | |
| CMSX-3 | <.006 | 8.0 | Rest | 4.6 | 0.6 | 8.0 | 6.0 | | 5.6 | 1.0 | <.003 | <.0075 | 0.10 |
| CMSX-4 | | 6.0 | Rest | 10.0 | 0.6 | 6.0 | 6.0 | | 5.6 | 1.0 | | Re=3.0 | 0.10 |
| CMSX-6 | <.015 | 10.0 | Rest | 5.0 | 3.0 | <.10 | 2.0 | <.10 | 4.9 | 4.8 | <.003 | <.0075 | |
| PWA 1480 SX | <.006 | 10.0 | Rest | 5.0 | | 4.0 | 12.0 | | 5.0 | 1.5 | <.0075 | <.0075 | |
| PWA 1483 SX | 0.07 | 12.2 | Rest | 9.0 | 1.9 | 3.8 | 5.0 | | 3.6 | 4.2 | 0.0001 | 0.002 | |
| Co-Basis-Feingußlegierungen | | | | | | | | | | | | | |
| FSX 414 | 0.25 | 29.0 | 10 | Rest | | 7.5 | | | | | 0.010 | | |
| X 45 | 0.25 | 25.0 | 10 | Rest | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rest | | 7.5 | 4 | | | 0.3 | 0.010 | 0.60 | |
| CM 247 | 0.07 | 8.3 | Rest | 10.0 | 0.5 | 9.5 | 3.2 | | 5.5 | 0.7 | | | 1.5 | chemische Zusammensetzung in %

COMPOSITION FOR MATERIAL FOR LIQUID METAL DEPOSITION OR ADDITIVE MANUFACTURING, METHOD AND PRODUCT

CROSS REFERENCE TO RELATED APPLICATIONS

This application is the US National Stage of International Application No. PCT/EP2019/070863 filed 2 Aug. 2019, and claims the benefit thereof. The International Application claims the benefit of European Application No. EP18200073 filed 12 Oct. 2018. All of the applications are incorporated by reference herein in their entirety.

FIELD OF INVENTION

The invention relates to a composition of a nickel based alloy mixture which can be used for welding via especially liquid metal deposition or as a powder bed of an additive manufacturing method.

BACKGROUND OF INVENTION

For a blade tip repair with Laser Metal Deposition (LMD) standard alloys Inconel 625 and Merl 72 are used.
The oxidation resistance of both alloys at high temperatures T>1273K is not better than the base material Alloy247.

SUMMARY OF INVENTION

Therefore, aim of the invention is to overcome the problem described above.
The problem is solved by a material, a method and a product according to the independent claims.
The invention disclosure deals with the Laser Metal Deposition using powder additive material.
This material mixture can advantageously be used for blade tip repair with increased oxidation resistance in comparison to most currently used alloys alloys.
The oxidation resistance of the developed material mixture is better than the base material Alloy247.
A braze material has always a melting point at least 10K, especially at least 20K lower than the nickel or cobalt based superalloy.
The powder mixture can be advantageously welded using a standard power cladding process or used for any alternative manufacturing process, especially like SLM or SLS.
A standard heat treatment process for the base nickel based alloy is used for the subsequent brazing process.
The composition of the powder mixture is described as followed in wt %:
a braze: ≥5%<10%, especially Amdry DF-4B,
a NiCoCrAlY: 70%-30%,
a Nickel based superalloy: 20%-60%, especially Alloy 247, wherein the melting point of the braze is at least 10K, especially 20K lower than the melting point of the nickel or cobalt based superalloy.
The mixture comprises, especially consists of 3 powders with different compositions.
The metallic powder mixture comprises (in wt %) especially consists of (in wt %):

| | |
|---|---|
| Nickel (Ni) | from 51.00% to 58.00% |
| Carbon (C) | from 0.02% to 0.05% |
| Chromium (Cr) | from 11.00% to 15.00% |
| Cobalt (Co) | from 14.00% to 21.00% |
| Molybdenum (Mo) | from 0.05% to 0.35% |
| especially | from 0.01% to 0.30% |
| Tungsten (W) | from 1.80% to 5.80% |
| Titan (Ti) | from 0.10% to 0.50% |
| Aluminum (Al) | from 6.50% to 8.50% |
| Boron (B) | from 0.05% to 0.10% |
| especially | 0.08% |
| Tantalum (Ta) | from 0.80% to 2.20% |
| Hafnium (Hf) | from 0.20% to 0.80% |
| Yttrium (Y) | from 0.05% to 0.25% |
| especially | from 0.09% to 0.21% |
| Rhenium (Re) | from 0.40% to 1.10%. |

The advantages are
High oxidation resistant material made from standard powder alloys
Standard welding process "powder cladding" can be used for blade tip build up welding
The metallic powder mixture comprises the nickel (Ni) base superalloy comprises (in wt %):
especially consists of (in wt %):

| | |
|---|---|
| Carbon (C) | 0.05%-0.20% |
| especially | 0.07%-0.17% |
| Chromium(Cr) | 8.0%-23.0% |
| especially | 12.0%-23.0% |
| Cobalt (Co) | 8.0%-19.0% |
| especially | 9.0%-10.0% |
| very especially | 18.0%-19.0% |
| Tungsten(W) | 2.0%-10.0% |
| especially | 2.0%-4.5% |
| very especially | 9.0%-10.0% |
| Titan (Ti) | 0.6%-5.0% |
| Aluminum(Al) | 1.0%-6.0% |
| Boron (B) | 0.005%-0.002% |
| especially | 0.006%-0.015% |
| optionally | |
| Molybdenum (Mo) | 0.0%-4.5% |
| especially | 0.50%-4.0% |
| Tantalum (Ta) | 0.0%-4.5% |
| especially | 1.0%-4.5% |
| Hafnium (Hf) | 0.6%-1.5% |
| Zirconium (Zr) | 0.02%-0.12% |
| Niobium (Nb) | 0.5%-1.0% | especially no Yttrium (Y) and/or
no Rhenium (Re),
remainder Nickel (Ni),
especially
the nickel (Ni) base superalloy comprises (in wt %),
especially consists of (in wt %):

| | |
|---|---|
| Nickel (Ni) | 61.6% |
| Carbon (C) | 0.08% |
| Chromium (Cr) | 8.25% |
| Cobalt (Co) | 9.25% |
| Molybdenum (Mo) | 0.50% |
| Tungsten (W) | 9.50% |
| Titan (Ti) | 0.75% |
| Aluminum (Al) | 5.55% |
| Boron (B) | 0.02% |
| Tantalum (Ta) | 3.20% |
| Hafnium (Hf) | 1.30%, | especially no Yttrium (Y) and/or
no Rhenium (Re).
Advantageously the nickel based super alloy is selected from alloy247, Inconel625, Rene 80 and/or Merl72, especially alloy247.

Inconel 625 comprises (in wt %):
C 0.03-0.10%
Si≤0.5%
Mn≤0.5%
P≤0.020%
S≤0.015%
Ti≤0.40%
Cr 20.0-23.0%
Mo≤8.0 10.0%
Ni≥58%
Cu≤0.5%
Nb 3.15-4.15%
Al≤0.4%
Fe≤5.0%
Co≤1.0%.

René 80 comprises (in wt %):
Ni=60.0%,
Cr=14.0%,
Co=9.5%,
Ti=5.0%,
Mo=4.0%,
W=4.0%,
Al=3.0%,
C=0.17% a,
B=0.015%
Zr=0.03%.

Merl 72 comprises (in wt %)
47% Co,
20% Cr,
15% Ni,
9% W,
4.4% Al,
3% Ta,
1.1% Hf,
0.35% C,
0.2% Ti,
0.04% Y.

The braze alloy advantageously comprises (in wt %), especially consists of (in wt %):

| | |
|---|---|
| Nickel (Ni) | 40%-70% |
| Chromium (Cr) | 8.0%-23.0% |
| Cobalt (Co) | 5.0%-20.0% |
| Aluminum (Al) | 1.0%-10.0% |
| Boron (B) | 0.5%-4.00% |
| optionally | |
| Tantalum (Ta) | 1.0%-4.0% |
| Molybdenum (Mo) | 0.0%-5.0% |
| Hafnium (Hf) | 0.05%-0.09% |
| Tungsten (W) | 2.0%-10.0% |
| Titan (Ti) | 0.5%-5.0% | especially
no Yttrium (Y),
and/or no Rhenium (Re),
and/or no Carbon (C).

Especially the braze alloy comprises (in wt %), especially consists of (in wt %):

| | |
|---|---|
| Nickel (Ni) | 69.2% |
| Chromium (Cr) | 14.0% |
| Cobalt (Co) | 10.0% |
| Aluminum (Al) | 3.5% |
| Boron (B) | 0.75% |
| Tantalum (Ta) | 2.5% |
| Hafnium (Hf) | 0.06%, | especially
no Yttrium (Y) and/or
no Tungsten (W),
and/or no Titan (Ti),
and/or no Molybdenum (Mo),
and/or no Rhenium (Re),
and/or no Carbon (C).

The melt depressant Boron (B) in the braze alloy is at least partially replaced by or it is additionally added: Silicon (Si) and/or Magnesium (Mg) and/or Mangan (Mn).

NiCoCrAlY alloy means NiCoCrAlY—X wherein X is optionally Tantalum (Ta), Silicon (Si) and/or Rhenium (Re), . . . .

Especially the listening of NiCoCrAlY and optional X=Tantalum (Ta), Silicon (Si), Iron (Fe) or Rhenium (Re).

The NiCoCrAlY composition advantageously comprises (in wt %):
20%-22% Chromium (Cr),
10.5%-11.5% Aluminum (Al),
0.3%-0.5% Yttrium (Y),
1.5%-2.5% Rhenium (Re) or
between 0.5%-1.5% Rhenium and
11%-13% Cobalt (Co) and
a remainder Nickel (Ni).

Further advantageously example for NiCoCrAlY composition comprises (in wt %) 15%-21% Chromium (Cr),
24%-26% Cobalt (Co),
9.0%-11.5% Aluminum (Al),
0.05%-0.7% Yttrium (Y),
0.5%-2.0% Rhenium (Re) and
a remainder Nickel.

Further example of a NiCoCrAlY composition comprises (in wt %):
22%-24% Cobalt (Co),
14%-16% Chromium (Cr),
10.5%-11.5% Aluminum (Al),
0.2%-0.4% Yttrium (Y),
optional 0.3%-0.9% Tantalum (Ta),
remainder Nickel (Ni).

The braze alloys comprises boron (B) and/or silicon (Si) and/or Magnesium (Mg) and/or Mangan (Mn) as melting depressant and examples for commercially available brazes are so called Amdry powders, example given Amdry DF-4B.

The braze material is advantageously a nickel based alloy with at least 0.5 wt % Boron (B), especially at least 0.7 wt % Boron (B) and/or at least 1.0 wt % Silicon (Si), especially at least 1.5 wt % Silicon (Si) and/or at least 2.0 wt % Magnesium (Mg), very especially the braze alloy Amdry DF-4B.

BRIEF DESCRIPTION OF THE DRAWINGS

FIG. 3 lists further examples of alloys.

DETAILED DESCRIPTION OF INVENTION

Figure 1:
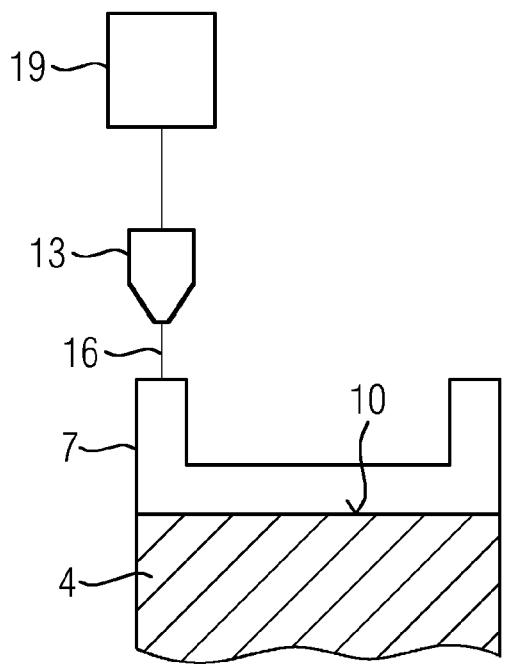
FIG. 1 shows a method how to apply the inventive material during welding and FIG. 2 shows a schematic arrangement to use the inventive powder for additive manufacturing, especially via laser.

The description and the figures are only examples of the invention.

This method and the material can be used to build up totally new component starting on a base plate or to repair an existing substrate 4 which both means a build up of material.

The build up of material is necessary to erosion or cracks which have been removed. In this case, only for example, a blade tip is repaired by building up the material onto a blade tip 7. The surface 10 of the substrate 4 reveals the base on which the material is applied on. The material 16 is applied via a nozzle 13 which is connected to a powder supply 19 is an inventive material. The nozzle 13 also includes a laser which together with the powder 16 is used for welding by melting the powder via a laser beam (not shown).

The inventive material can also be produced as a rod and or a wire and can be used via wire welding.

Figure 2:
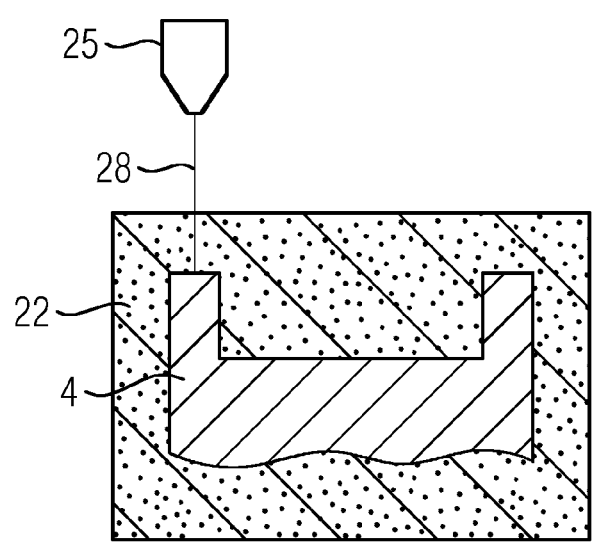

In FIG. 2 another application of the inventive material is shown.

Here a selective laser melting process (also electron beams can be used instead of a laser) wherein a powder bed 22 with the inventive powder mixture is used to create a totally new component or even to repair a substrate 4.

The substrate 4 is totally inside the powder bed 22 and a laser 25 with a laser beam 28 is used to melt or to sinter partially a powder where a material build up onto the substrate 4 where it is needed or wanted.

The inventive material is a metallic powder mixture of three different powders.

Especially the powder mixture comprises alloy 247 or generally a nickel based super alloy and a NiCoCrAlY, a braze alloy which has at least a melting point at least 20K lower than the nickel based super alloy.

Further examples for the nickel based super alloy are listed in FIG. 3.

NiCoCrAlY can also comprise optionally additions like Rhenium (Re), Tantalum (Ta) and/or Silicon (Si), very especial only these ones.

Another example is, wherein first direct on the substrate a layer of a mixture consisting of a NiCoCrAlY especially according to dependent claims and a nickel or cobalt based superalloy, especially according to dependent claims is applied and then layers of a mixture according to certain claims.

The invention claimed is:

1. A metallic powder mixture, usable for build up via liquid metal deposition or any additive manufacturing method, comprising (in wt %):
   a nickel (Ni) based superalloy with a content of 20% to 60%,
   a NiCoCrAlY-composition with a content of 70% to 30% and
   a metallic braze material with a content between 10% to 5%,
   wherein the melting point of the braze material is at least 10K lower than the melting point of the nickel based superalloy, wherein the nickel (Ni) based superalloy comprises (in wt %):
   Cobalt (Co) 18.0%-19.0%
   wherein the NiCoCrAlY composition comprises (in wt %):
   14%-22% Chromium (Cr)
   9.0%-11.5% Aluminum (Al)
   0.3%-0.5% Yttrium (Y)
   11%-26% Cobalt (Co)
   0%-1.0% Silicon (Si),
   0%-2.5% Rhenium (Re)
   and remainder Nickel (Ni).

2. The metallic powder mixture according to claim 1, comprising (in wt %):

| | |
|---|---|
| Nickel (Ni) | from 51.00% to 58.00% |
| Carbon (C) | from 0.02% to 0.05% |
| Chromium (Cr) | from 11.00% to 15.00% |
| Molybdenum (Mo) | from 0.05% to 0.35% |
| Tungsten (W) | from 1.80% to 5.80% |
| Titanium (Ti) | from 0.10% to 0.50% |
| Aluminum (Al) | from 6.50% to 8.50% |
| Boron (B) | from 0.05% to 0.10% |
| Tantalum (Ta) | from 0.80% to 2.20% |
| Hafnium (Hf) | from 0.20% to 0.80% |
| Yttrium (Y) | from 0.05% to 0.25% |
| Rhenium (Re) | from 0.40% to 1.10%. |

3. The metallic powder mixture according to claim 1, wherein the nickel (Ni) base superalloy further comprises (in wt %):

| | |
|---|---|
| Carbon (C) | 0.05%-0.20% |
| Chromium (Cr) | 8.0%-23.0% |
| Tungsten (W) | 2.0%-10.0% |
| Titanium (Ti) | 0.6%-5.0% |
| Aluminum (Al) | 1.0%-6.0% |
| Boron (B) | 0.005%-0.02% |
| optionally | |
| Molybdenum (Mo) | 0.0%-4.5% |
| Tantalum (Ta) | 0.0%-4.5% |
| Hafnium (Hf) | 0.6%-1.5% |
| Zirconium (Zr) | 0.02%-0.12% |
| Niobium (Nb) | 0.5%-1.0% | no Yttrium (Y) and/or
no Rhenium (Re),
remainder Nickel (Ni).

4. A metallic powder mixture, usable for build up via liquid metal deposition or any additive manufacturing method, comprising (in wt %):
   a nickel (Ni) based superalloy with a content of 20% to 60%,
   a NiCoCrAlY-composition with a content of 70% to 30% and
   a metallic braze material with a content between 10% to 5%,
   wherein the melting point of the braze material is at least 10K lower than the melting point of the nickel based superalloy,
   wherein the nickel (Ni) based superalloy comprises (in wt %):

| | |
|---|---|
| Nickel (Ni) | 61.6% |
| Carbon (C) | 0.08% |
| Chromium (Cr) | 8.25% |
| Molybdenum (Mo) | 0.50% |
| Tungsten (W) | 9.50% |
| Titan (Ti) | 0.75% |
| Aluminum (Al) | 5.55% |
| Boron (B) | 0.02% |
| Tantalum (Ta) | 3.20% |
| Hafnium (Hf) | 1.30%, | no Yttrium (Y) and/or
no Rhenium (Re)
wherein the NiCoCrAlY composition comprises (in wt %):

14%-22% Chromium (Cr)
9.0%-11.5% Aluminum (Al)
0.3%-0.5% Yttrium (Y)
11%-26% Cobalt (Co)
0%-1.0% Silicon (Si),
0%-2.5% Rhenium (Re)
and remainder Nickel (Ni).

5. The metallic powder mixture according to claim 1, wherein the braze alloy comprises (in wt %):

| | |
|---|---|
| Nickel (Ni) | 40%-70% |
| Chromium (Cr) | 8.0%-23.0% |
| Cobalt (Co) | 5.0%-20.0% |
| Aluminum (Al) | 1.0%-10.0% |
| Boron (B) optionally | 0.5%-4.00% |
| Tantalum (Ta) | 1.0%-4.0% |
| Molybdenum (Mo) | 0.0%-5.0% |
| Hafnium (Hf) | 0.05%-0.09% |
| Tungsten (W) | 2.0%-10.0% |
| Titanium (Ti) | 0.5%-5.0% | no Yttrium (Y),
and/or no Rhenium (Re),
and/or no Carbon (C).

6. The metallic powder mixture according to claim 1, wherein the braze alloy comprises (in wt %):

| | |
|---|---|
| Nickel (Ni) | 69.2% |
| Chromium (Cr) | 14.0% |
| Cobalt (Co) | 10.0% |
| Aluminum (Al) | 3.5% |
| Boron (B) | 0.75% |
| Tantalum (Ta) | 2.5% |
| Hafnium (Hf) | 0.06%, | no Yttrium (Y) and/or
no Tungsten (W),
and/or no Titanium (Ti),
and/or no Molybdenum (Mo),
and/or no Rhenium (Re),
and/or no Carbon (C).

7. The metallic powder mixture according to claim 1, wherein the metallic braze material comprises:
Silicon (Si) and/or Magnesium (Mg) and/or Manganese (Mn).

8. The metallic powder mixture according to claim 1, wherein the braze material is a nickel-based alloy with at least 0.5 wt % Boron (B), and/or
at least 1.0 wt % Silicon (Si),
and/or
at least 2.0 wt % Magnesium (Mg).

9. The metallic powder mixture according to claim 1, wherein the NiCoCrAlY composition consists of NiCoCrAlY and optionally Tantalum (Ta), Rhenium (Re), Iron (Fe) and/or Silicon (Si).

10. The metallic powder mixture according to claim 1, wherein the NiCoCrALY composition comprises (in wt %):

| | |
|---|---|
| 20%-22% | Chromium (Cr) |
| 10.5%-11.5% | Aluminum (Al) |
| 0.3%-0.5% | Yttrium (Y) |
| 1.5%-2.5% | Rhenium (Re) |
| 11%-13% | Cobalt (Co) and remainder Nickel. |

11. The metallic powder mixture according to claim 1, wherein the NiCoCrAlY composition comprises (in wt %):

| | |
|---|---|
| 15%-21% | Chromium (Cr) |
| 24%-26% | Cobalt (Co) |
| 9.0%-11.5% | Aluminum (Al) |
| 0.05%-0.7% | Yttrium (Y) |
| 0.5%-2.0% | Rhenium (Re) and remainder Nickel. |

12. The metallic powder mixture according to claim 1, wherein the NiCoCrAlY composition comprises (in wt %):

| | |
|---|---|
| 22%-24% | Cobalt (Co) |
| 14%-16% | Chromium (Cr) |
| 10.5%-11.5% | Aluminum (Al) |
| 0.2%-0.4% | Yttrium (Y), optionally |
| 0.3%-0.9% | Tantalum (Ta) and remainder Nickel (Ni). |

13. A method to build up metallic material, comprising:
building up a metallic powder mixture of claim 1.

14. The method according to claim 13,
wherein the building up of the metallic powder mixture is used for welding using powder cladding, wire welding or for additive manufacturing using powder beds.

15. A product, comprising:
a metallic powder mixture according to claim 1.

16. The product according to claim 15,
wherein first directly on a substrate a layer of a mixture consisting of a NiCoCrAlY, and
a nickel or cobalt based superalloy is applied on the substrate,
and then layers of the metallic powder mixture are applied.

* * * * *